US008089271B2

(12) United States Patent
Kottmyer et al.

(10) Patent No.: US 8,089,271 B2
(45) Date of Patent: Jan. 3, 2012

(54) SENSE MAGNET ASSEMBLY INCLUDING MULTIPLE ANNULAR PORTIONS WITH ALTERNATING MAGNETIC POLES

(75) Inventors: Daniel L. Kottmyer, Springfield, OH (US); Scott P. Kreger, Springfield, OH (US)

(73) Assignee: Globe Motors, Inc., Dayton, OH (US)

( * ) Notice: Subject to any disclaimer, the term of this patent is extended or adjusted under 35 U.S.C. 154(b) by 873 days.

(21) Appl. No.: 12/103,402

(22) Filed: Apr. 15, 2008

(65) Prior Publication Data
US 2008/0252286 A1 Oct. 16, 2008

Related U.S. Application Data

(60) Provisional application No. 60/912,069, filed on Apr. 16, 2007.

(51) Int. Cl.
*G01B 7/30* (2006.01)
(52) U.S. Cl. ............... 324/207.25; 324/207.2; 324/174
(58) Field of Classification Search ............ 324/207.2, 324/207.25, 174
See application file for complete search history.

(56) References Cited

U.S. PATENT DOCUMENTS

| 4,599,561 | A | * | 7/1986 | Takahashi et al. ....... 324/207.12 |
| 5,258,735 | A | | 11/1993 | Allwine, Jr. |
| 5,313,159 | A | | 5/1994 | Allwine, Jr. |
| 5,900,727 | A | | 5/1999 | Griffen et al. |
| 6,124,709 | A | | 9/2000 | Allwine |
| 7,075,290 | B2 | * | 7/2006 | Collier-Hallman et al. .. 324/163 |
| 7,119,535 | B2 | * | 10/2006 | Butzmann et al. ....... 324/207.25 |
| 7,181,984 | B2 | * | 2/2007 | Ching-shun et al. ...... 73/862.331 |
| 2004/0196028 | A1 | * | 10/2004 | Schroeder et al. ....... 324/207.22 |
| 2006/0261803 | A1 | | 11/2006 | Faetanini et al. |
| 2007/0029995 | A1 | | 2/2007 | Ichiman |

FOREIGN PATENT DOCUMENTS

JP 01068619 A * 3/1989

* cited by examiner

*Primary Examiner* — Jay Patidar
(74) *Attorney, Agent, or Firm* — Stevens & Showalter LLP

(57) ABSTRACT

A sense magnet assembly including a generally circular hub portion defining a central axis. The hub portion includes a generally disk-shaped base portion and an outer wall extending axially from an outer edge of the base portion. An elastic magnet material is provided including a plurality of annular portions positioned at radially spaced locations. A substantially rigid annular divider formed of a non-magnetic material is located between adjacent pairs of the annular portions of the magnet material, and a rigid cover is provided extending over the magnet material to limit movement of the magnet material in response to centrifugal forces.

14 Claims, 4 Drawing Sheets

SENSE MAGNET ASSEMBLY INCLUDING MULTIPLE ANNULAR PORTIONS WITH ALTERNATING MAGNETIC POLES

CROSS-REFERENCE TO RELATED APPLICATION

This application claims the benefit of U.S. Provisional Application No. 60/912,069, filed Apr. 16, 2007, which is incorporated herein by reference.

FIELD OF THE INVENTION

The present invention relates to sense magnets and, more particularly, to a sense magnet assembly, such as may be used in a position encoder, capable of operating at elevated temperatures and at high rotational speeds.

BACKGROUND OF THE INVENTION

Position encoders are used in a variety of applications to provide feedback identifying the position of a moveable member. Such moveable members may comprise a steering wheel for a vehicle, a rotor shaft in a brushless electric motor, or other structures in which the position and/or velocity of a rotating member relative to a stationary member needs to be tracked or identified. The encoder may typically be in the form of a magnetic encoder comprising a sense magnet assembly including a plurality of magnetized regions located in a circumferential alternating pattern. A Hall sensor may be provided adjacent to the sense magnet assembly for determining the rotational position of a rotating shaft or rotor of the moveable member.

In a particular construction of a known sense magnet assembly, as seen in FIG. 1, a sense magnet assembly 10 comprises a layer of magnet material 12, a ferrous back iron 14, and a non-magnetic hub 16. The inner diameter 18 of the hub 16 may comprise an opening that may be positioned onto the rotating shaft (not shown) of a moveable member, such as the rotor of an electric motor (not shown). Adhesive may be used to create a bond in the areas of contact between the sense magnet material 12, the back iron 14, and the hub 16. In a typical exemplary application, the sense magnet assembly 10 may be rigidly attached to a rotating component (not shown) that is fixed to a motor shaft for rotation with the motor shaft. The sense magnet assembly 10 may be attached to the rotating component by any conventional means, such as by means of an adhesive or threaded fasteners (not shown) passing through holes 20 in the sense magnet assembly 10 for engagement with the rotating component.

The magnet material 12 is magnetized to provide a circumferential pattern of alternating north and south poles that may be detected by a stationary sensor structure 22 comprising Hall sensors 24 located near the top face of the magnet material 12 in order to provide information about the speed and position of the rotating motor shaft. The magnet material 12 may be magnetized with any number of circumferential patterns existing at various diameters within the magnet material 12.

The magnet material 12 may comprise a relatively elastic material held in place on the back iron 14 by an adhesive. As used herein, the term 'elastic' may describe a material that is soft, flexible, or non-rigid, or a material that may become soft, flexible, or non-rigid when exposed to the environmental or operating conditions of the end product, i.e., an electric motor, such as high temperature operating conditions.

The adhesive used to hold the magnet material 12 in place may comprise a weak adhesive, where the term 'weak' is used herein to describe an adhesive with low tensile strength, an adhesive that does not bond well to one or all of the above-described sense magnet assembly components, or an adhesive with low tensile or bond strength when exposed to the environmental conditions of the end product, such as high temperature operating conditions. As a result of forming the described known sense magnet assembly 10 with, for example, an elastic magnet material 12 attached with a weak adhesive or no adhesive, the magnet material 12 may become detached from the adjacent structure in response to centrifugal forces applied by high rotational speeds of the motor shaft. As illustrated in FIGS. 2A and 2B, as the motor shaft rotates, the elastic magnet material 12 may buckle or bulge, as illustrated at 26 in FIG. 2A, or may lift away from the underlying back iron 14, as illustrated at 28 in FIG. 2B. Further, the magnet material 12 is typically formed as a single continuous disk of elastic material, such that the material closest to the axis of rotation will generally push outwardly on the material forming the radial outer portions of the magnet material 12, causing the radial outer portions of the magnet material 12 to be forced axially out of the motor assembly 10 and possibly strike another component of the sense magnet assembly 10, such as the sensor structure 22, or may even distort or deflect the hub 16. Contact between the magnet material 12 and another component of the motor assembly, such as the sensor structure 22, could cause catastrophic damage within the motor assembly, resulting in failure of the motor.

SUMMARY OF THE INVENTION

In accordance with one aspect of the invention, a sense magnet assembly is provided comprising a generally circular hub portion defining a central rotational axis for the sense magnet assembly. A magnet material is provided comprising a plurality of annular portions including at least a first annular portion and a second annular portion. The second annular portion is located radially outwardly from the first annular portion, and a substantially rigid annular divider is located between the first and second annular portions of the magnet material.

In accordance with another aspect of the invention, a sense magnet assembly is provided for use in a system for sensing the relative displacement between first and second members. The system comprises at least two detector devices for sensing variations in magnetic properties of the sense magnet assembly, and the sense magnet assembly comprises a generally circular hub portion defining a central rotational axis for the sense magnet assembly. The hub portion includes a generally disk-shaped base portion and an outer wall extending axially from an outer edge of the base portion. An elastic magnet material is provided comprising a plurality of annular portions including at least a first annular portion and a second annular portion. The second annular portion is located radially outwardly from the first annular portion, and each of the first and second tracks include a predetermined number of sectors comprising alternating north and south magnetic poles. A substantially rigid annular divider is formed of a non-magnetic material and is located between the first and second annular portions of the magnet material.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
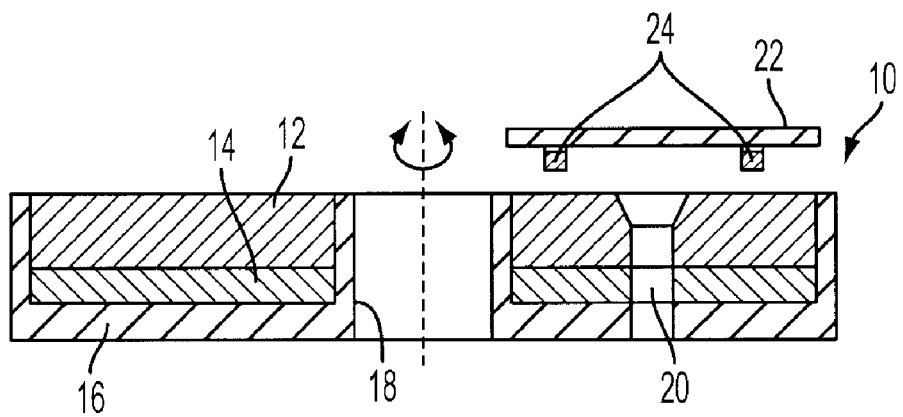
FIG. 1 is a cross-sectional view illustrating a system incorporating a prior art sense magnet assembly.
Figure 2A:
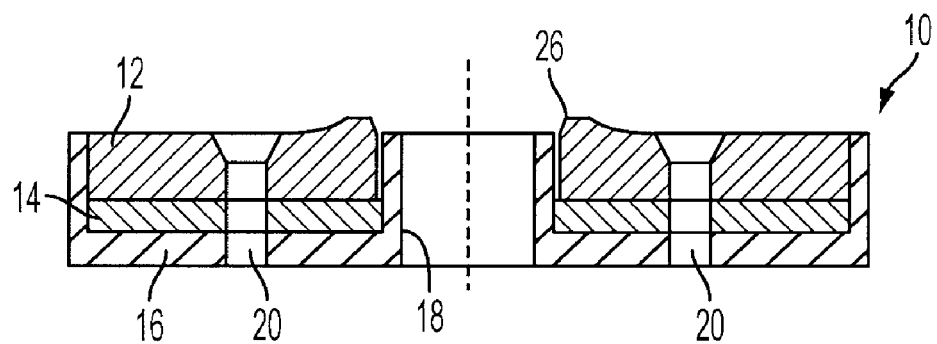
FIGS. 2A and 2B are cross-sectional views illustrating movement of an elastic magnet material of the prior art sense magnet assembly.
Figure 2B:
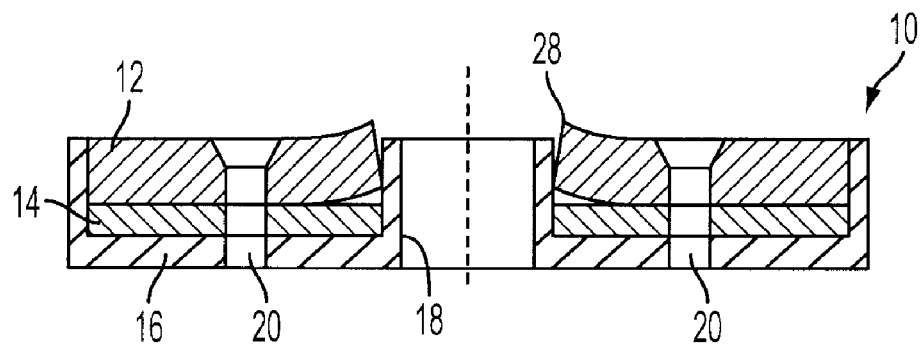
Figure 3:
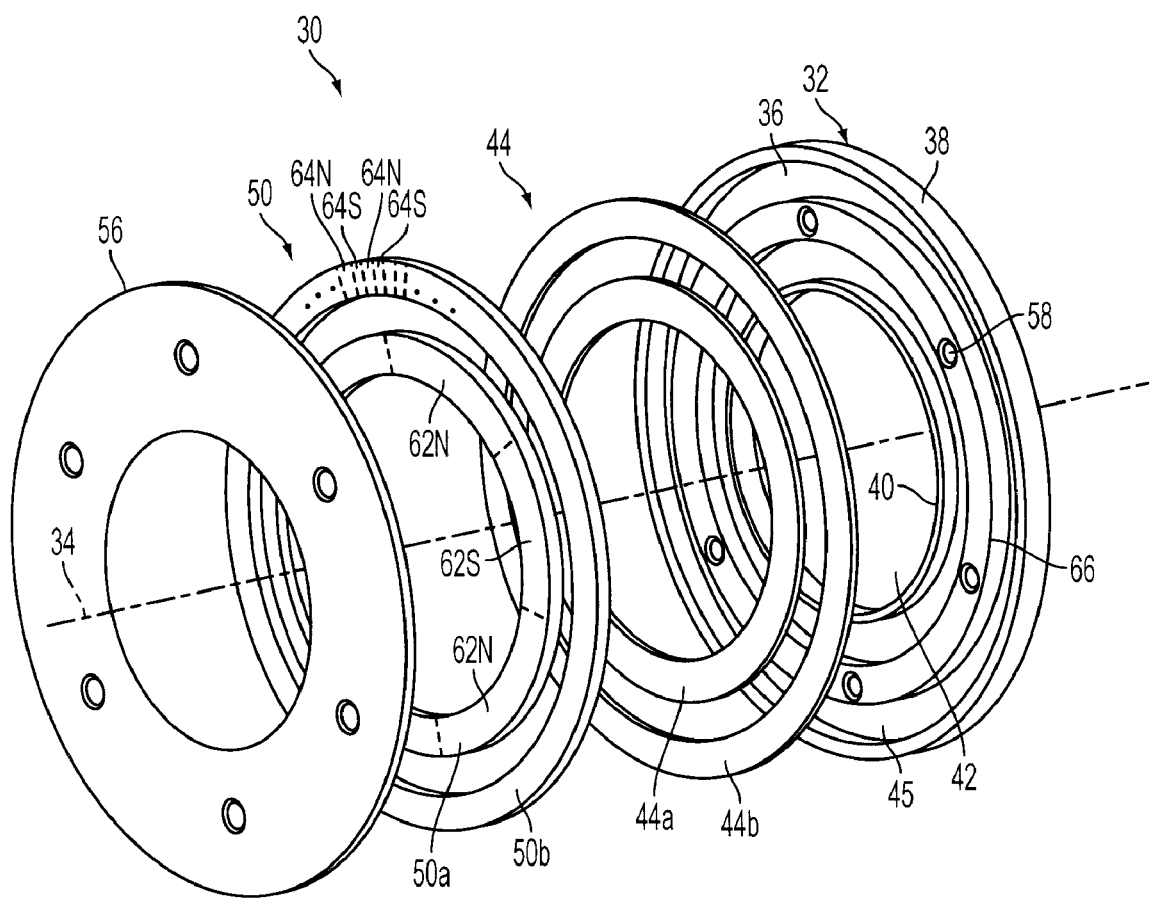
FIG. 3 is an exploded perspective view of a sense magnet assembly constructed in accordance with the present invention.
Figure 4:
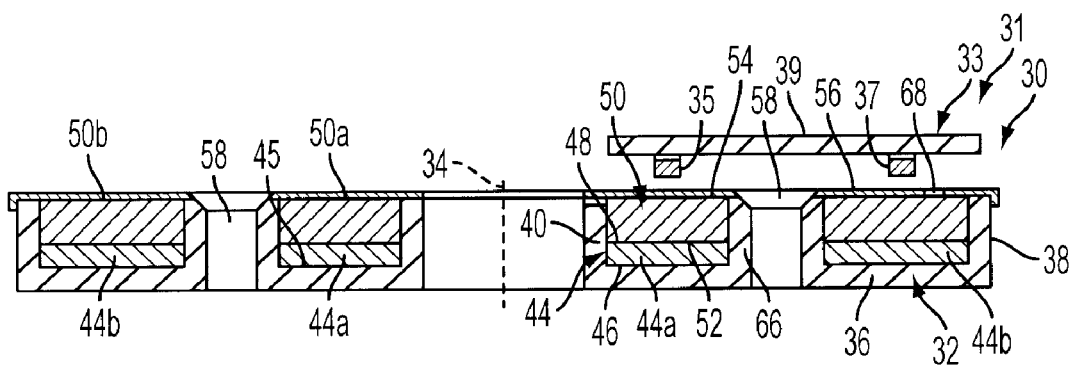
FIG. 4 is a cross-sectional view of a system incorporating the sense magnet assembly of FIG. 3.

Referring to FIGS. 3 and 4, a sense magnet assembly 30 illustrates a first embodiment of the invention, including a system 31 (FIG. 4) incorporating the sense magnet assembly 30 for sensing relative displacement between first and second members. For example, the system 31 may form an encoder for sensing the movement of a rotating shaft member, where the first member may comprise the sense magnet assembly 30 and the second member may comprise at least a sensor structure 33, having detector devices which may comprise first and second Hall sensors 35, 37 mounted to a printed circuit board (PCB) 39 and located adjacent to the sense magnet assembly 30.

The sense magnet assembly 30 includes a generally circular hub portion 32 defining a central rotational axis 34. The hub portion 32 is formed of a non-magnetic material and comprises a generally disk-shaped base portion 36 and an outer wall 38 extending axially from an outer edge of the base portion 36. An interior diameter of the hub portion 32 may be formed by an inner wall 40 extending axially from the base portion 36 and defining a central opening 42 (FIG. 3) for receiving a rotatable shaft, such as the shaft of a motor (not shown).

It should be noted that the sense magnet assembly 30 shown in FIG. 3 is illustrated with component parts that are dimensioned differently than the component parts of the assembly 30 illustrated in FIG. 4. However, there is a substantially identical correspondence of structure between the component parts of the assemblies 30 illustrated in FIGS. 3 and 4.

A ferrous portion 44 comprising a back iron for the assembly 30 is provided having a first face 46 and an opposing second face 48. The first face 46 of the ferrous portion 44 is supported on an inner surface 45 of the base portion 36 and the second face 48 faces outwardly. A magnet portion 50 comprising an elastic magnet material is provided having a first face 52 supported on the second face 48 of the ferrous portion 44, and including an opposing outwardly facing second face 54. A disk-shaped cover member 56 formed of a non-magnetic material is positioned over the second face 54 of the magnet portion 50 and spans radially between the inner wall 40 and the outer wall 38.

The ferrous portion 44 is divided into an annular first ferrous member 44a and an annular second ferrous member 44b, where the second ferrous member 44b is spaced radially outwardly from the first ferrous member 44a. The magnet portion 50 is divided into an annular first magnet member 50a and an annular second magnet member 50b spaced radially outwardly from the first magnet member 50a. The first and second magnet members 50a, 50b may define separate magnetic tracks. Each of the tracks defined by the magnet members 50a, 50b may be magnetized in a circumferential pattern of magnetic poles designed to provide information on the rotational movement of the assembly 30. For example, the circumferential pattern may comprise alternating north and south poles 62N, 62S defined on the first magnet member 50a (only a portion of the poles are illustrated), and alternating north and south poles 64N, 64S defined on the second magnet member 50b. The rotational movement of the assembly 30 may be sensed by the Hall sensors 35, 37 mounted on the sensor structure 33 adjacent to the assembly 30 (FIG. 4).

The first ferrous member 44a and the first magnet member 50a may be separated from the respective second ferrous member 44b and second magnet member 50b by an annular divider 66 formed of a substantially rigid non-magnetic material, circumscribing the outer circumference of the first magnet member 50, and located within the inner circumference of the second magnet member 50b. In the present embodiment, the divider 66 may comprise a member rigidly fixed to the base portion 36 of the hub portion 32, and the divider 66 may be formed integrally with the base portion 36.

The material of the hub portion 32 and the divider 66 may comprise aluminum or any other substantially rigid non-magnetic material. The material of the magnet portion 50 may comprise a rubber bonded strontium ferrite flexible magnet material.

The assembly 30 may be held together by an adhesive, including providing an adhesive attachment of the cover member 56 to the hub portion 32 and/or the magnet portion 50, and additionally may include adhesive attachment of the ferrous portion 44 to the base portion 36 and/or attachment of the magnet portion 50 to the ferrous portion 44 including, for example, attachment by a weak adhesive, as defined above. Additionally, or alternatively, through passages 58 may be defined in the assembly 30 passing through the cover member 56, the divider 66 and the base portion 36 for receiving fasteners (not shown), such as threaded fasteners, that may maintain the components of the assembly 30 in an assembled state and may support the assembly 30 to a rotating component (not shown) attached to a shaft, such as a motor shaft (not shown). The cover 56 is illustrated as having vent holes 68 (FIG. 4) for permitting escape of excess adhesive as the cover 56 is assembled to the hub portion 32. Also, the vent holes 68 may be located to facilitate a metal-to-metal bonding of the cover 56 to either or both of the inner wall 40 and the outer wall 38 of the hub portion 32.

The divider 66 provides a structural support to the magnet portion 50 at a radially intermediate location between the inner wall 40 and the outer wall 38. The divider 66 separates the second magnet member 50b from being acted upon by the first magnet member 50a as centrifugal forces tend to move the first magnet member 50a radially outwardly during rotation of the assembly 30. Further, the cover member 56 comprises a rigid or stiff member that resists the tendency of the first and second magnet members 50a, 50b from moving axially out of the hub portion 32 to prevent damage to the magnet portion 50 of the assembly 30.

Figure 5:
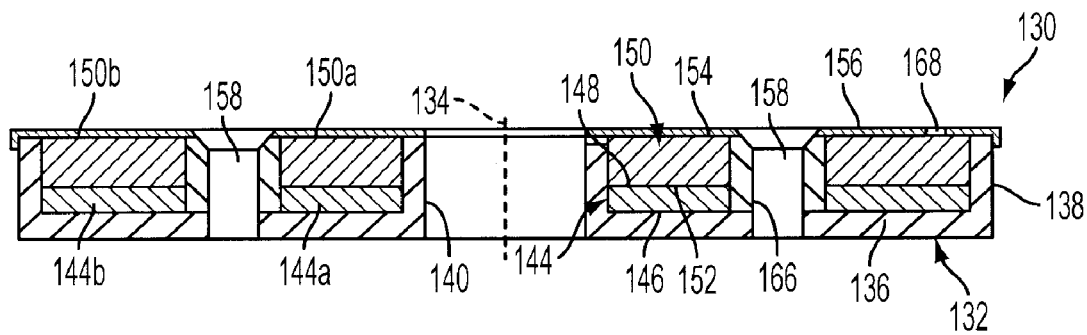
FIG. 5 is a cross-sectional view of a second embodiment of the sense magnet assembly of the invention.

Referring to FIG. 5, a second embodiment of the invention is illustrated in which elements corresponding to the first embodiment are labeled with the same reference numeral increased by 100.

The elements of the assembly 130 of the second embodiment are substantially similar to those of the first embodiment with the exception of the divider 166. The divider 166 is formed as a separate annular ring that is not attached to the base portion 136 or cover member 156. The annular divider 166 comprises a non-magnetic rigid material that resists outward movement of the first magnet member 150a, acting to limit outward movement of the first magnet member 150a and reducing the forces that may tend to cause the second magnet member 150b to move outwardly.

Figure 6:
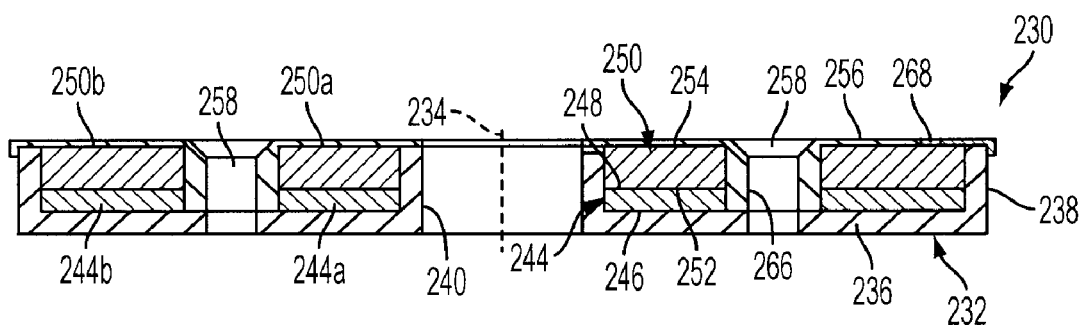
FIG. 6 is a cross-sectional view of a third embodiment of the sense magnet assembly of the invention.

Referring to FIG. 6, a third embodiment of the invention is illustrated in which elements corresponding to the first embodiment are labeled with the same reference numeral increased by 200.

The elements of the assembly 230 of the third embodiment are substantially similar to those of the first embodiment with the exception of the divider 266. The divider 266 is formed as an annular ring that is rigidly fixed to the cover member 256, and the divider 266 may be formed integrally with the cover member 256. The annular divider 266 comprises a non-magnetic rigid material that resists outward movement of the first magnet member 250a, acting to limit outward movement of the first magnet member 250a and reducing the forces that may tend to cause the second magnet member 250b to move outwardly.

Figure 7:
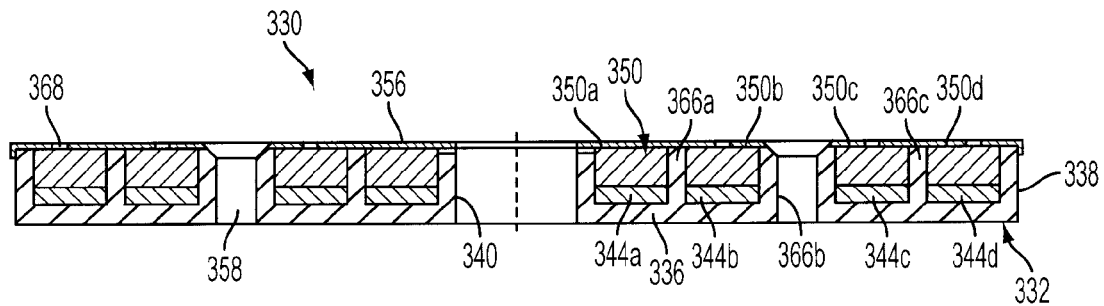
FIG. 7 is a cross-sectional view of a fourth embodiment of the sense magnet assembly of the invention.

Referring to FIG. 7, a fourth embodiment of the invention is illustrated in which elements corresponding to the first embodiment are labeled with the same reference numeral increased by 300.

The assembly 330 of the fourth embodiment is characterized by the ferrous portion 344 being comprised of four annular ferrous members 344a, 344b, 344c, 344d, and the magnet portion 350 being comprised of four annular magnet members 350a, 350b, 350c, 350d. The ferrous member 344a and magnet member 350a are separated from the ferrous member 344b and magnet member 350b by a first divider member 366a, the ferrous member 344b and magnet member 350b are separated from the ferrous member 344c and magnet member 350c by a second divider member 366b, and the ferrous member 344c and magnet member 350c are separated from the ferrous member 344d and magnet member 350d by a third divider member 366c. Each of the divider members 366a, 366b, 366c comprise a non-magnetic material rigidly fixed to the base portion 336, and may be formed integrally with the base portion 336. The magnet members 350a, 350b, 350c, 350d may comprise separate magnetic tracks, and the divider members 366a, 366b, 366c function to resist radial outward movement of the three radially innermost magnet members 350a, 350b, 350c. It should be noted with regard to the presently described embodiment, as well as with regard to the following embodiments described in relation to FIGS. 8 and 9, the present invention encompasses an assembly with any number of plural magnetic tracks where each adjacent pair of circumferential magnetic tracks are separated by a divider member.

Figure 8:
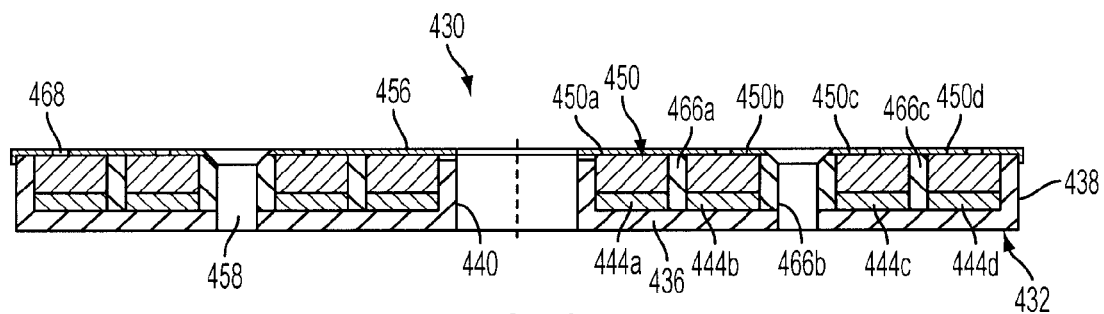
FIG. 8 is a cross-sectional view of a fifth embodiment of the sense magnet assembly of the invention.

Referring to FIG. 8, a fifth embodiment of the invention is illustrated in which elements corresponding to the first embodiment are labeled with the same reference numeral increased by 400.

The assembly 430 of the fifth embodiment is characterized by the ferrous portion 444 being comprised of four annular ferrous members 444a, 444b, 444c, 444d, and the magnet portion 450 being comprised of four annular magnet members 450a, 450b, 450c, 450d. The ferrous member 444a and magnet member 450a are separated from the ferrous member 444b and magnet member 450b by a first divider member 466a, the ferrous member 444b and magnet member 450b are separated from the ferrous member 444c and magnet member 450c by a second divider member 466b, and the ferrous member 444c and magnet member 450c are separated from the ferrous member 444d and magnet member 450d by a third divider member 466c. Each of the divider members 466a, 466b, 466c comprise a separate annular ring that is not attached to the base portion 436 or the cover member 456. The magnet members 450a, 450b, 450c, 450d may comprise separate magnetic tracks, and the divider members 466a, 466b, 466c function to resist radial outward movement of the three radially innermost magnet members 450a, 450b, 450c.

Figure 9:
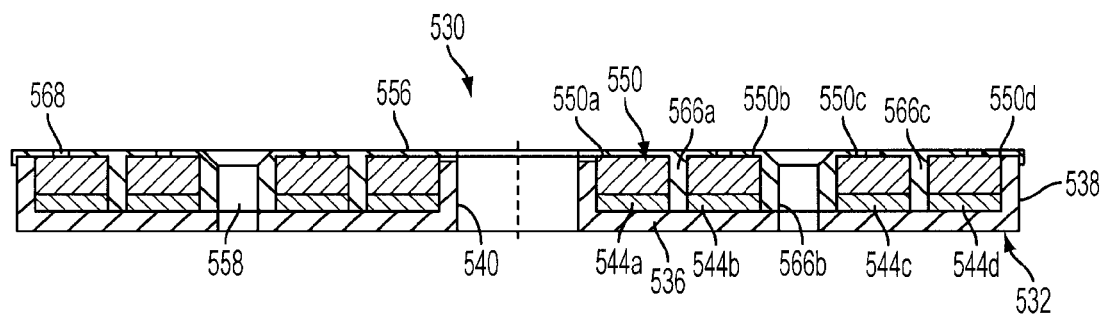
FIG. 9 is a cross-sectional view of a sixth embodiment of the sense magnet assembly of the invention.

Referring to FIG. 9, a sixth embodiment of the invention is illustrated in which elements corresponding to the first embodiment are labeled with the same reference numeral increased by 500.

The assembly 530 of the fourth embodiment is characterized by the ferrous portion 544 being comprised of four annular ferrous members 544a, 544b, 544c, 544d, and the magnet portion 550 being comprised of four annular magnet members 550a, 550b, 550c, 550d. The ferrous member 544a and magnet member 550a are separated from the ferrous member 544b and magnet member 550b by a first divider member 566a, the ferrous member 544b and magnet member 550b are separated from the ferrous member 544c and magnet member 550c by a second divider member 566b, and the ferrous member 544c and magnet member 550c are separated from the ferrous member 544d and magnet member 550d by a third divider member 566c. Each of the divider members 566a, 566b, 566c comprise a non-magnetic material formed as an annular ring that is rigidly fixed to the cover member 556, and which may be formed integrally with the cover member 556. The magnet members 550a, 550b, 550c, 550d may comprise separate magnetic tracks, and the divider members 566a, 566b, 566c function to resist radial outward movement of the three radially innermost magnet members 550a, 550b, 550c.

It should be understood that various combinations of the embodiments described with reference to FIGS. 7-9 are possible. In particular, the sense magnet assembly could include multiple magnetic tracks where a combination of the above-described divider members is provided, i.e., some of the divider members may be provided as separate members, as fixed to the hub portion, and/or as fixed to the cover member.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A sense magnet assembly comprising:
 a generally circular hub portion defining a central rotational axis extending axially for said sense magnet assembly;

said hub portion including a generally disk-shaped base portion and an outer wall extending axially from an outer edge of said base portion;

a magnet material comprising a plurality of annular portions including at least a first annular portion and a second annular portion, said second annular portion located radially outwardly from said first annular portion in engagement with said outer wall;

said magnet material formed of an elastic material;

said first annular portion including an annular face facing axially outwardly;

said second annular portion including an annular face facing axially outwardly and located radially outwardly from said annular face of said first annular portion;

a substantially rigid annular divider located radially between said first and second annular portions of said magnet material; and a disk shaped cover member extending across said magnet material to said outer wall and located for engagement with said annular faces of said first and second annular portions for axially retaining said magnet material in said hub portion.

2. The assembly of claim 1, wherein said base portion defines an inner surface and said magnet material includes a first face and an opposing second face, said first face of said magnet material being located adjacent said inner surface of said base portion, and said second face being defined by said annular faces of said first and second annular portions.

3. The assembly of claim 2, wherein said annular divider extends axially between said first and second faces of said magnet material.

4. The assembly of claim 3, wherein said cover member extends adjacent to said second face of said magnet material and is engaged with said axially extending outer wall of said hub portion, said annular divider being rigidly fixed to said cover member.

5. The assembly of claim 3, wherein said annular divider is rigidly fixed to said inner surface of said base portion.

6. The assembly of claim 1, including a plurality of annular dividers comprising a plurality of rings of different diameters separating said magnet material into a plurality of annular regions at different diameters across said hub portion.

7. The assembly of claim 1, wherein each of said first and second annular portions include a predetermined number of sectors comprising alternating north and south magnetic poles.

8. In a system for sensing the relative displacement between first and second members, a sense magnet assembly and at least two detector devices for sensing variations in magnetic properties of the sense magnet assembly, the sense magnet assembly comprising:

a generally circular hub portion defining a central rotational axis extending axially for said sense magnet assembly, said hub portion including a generally disk-shaped base portion and an outer wall extending axially from an outer edge of said base portion;

an elastic magnet material comprising a plurality of annular portions including at least a first annular portion and a second annular portion, said second annular portion located radially outwardly from said first annular portion;

said first annular portion including an annular face facing axially outwardly away from said base portion;

said second annular portion including an annular face facing axially outwardly away from said base portion and located radially outwardly from said annular face of said first annular portion;

each of said first and second annular portions include a predetermined number of sectors comprising alternating north and south magnetic poles;

a substantially rigid annular divider formed of a non-magnetic material and located radially between said first and second annular portions of said magnet material; and a disk shaped cover member extending across said magnet material to said outer wall and located for engagement with said annular faces of said first and second annular portions for axially retaining said magnet material in said hub portion.

9. The system of claim 8, wherein said base portion includes an inner surface and said magnet material includes a first face and an opposing second face, said first face of said magnet material being located adjacent said inner surface of said base portion, said second face being defined by said annular faces of said first and second annular portions, and said annular divider extends axially between said first and second faces of said magnet material.

10. The system of claim 9, wherein said cover member extends adjacent to said second face of said magnet material and is engaged with said outer wall of said hub portion.

11. The system of claim 10, wherein said cover member is rigidly fixed to said outer wall of said hub portion.

12. The system of claim 10, wherein said annular divider is rigidly fixed to and extends axially from said cover member.

13. The system of claim 9, wherein said annular divider is rigidly fixed to said inner surface of said base portion and extends axially toward said cover member.

14. The system of claim 8, including a plurality of annular dividers comprising a plurality of substantially rigid rings of non-magnetic material, said plurality of annular dividers having different diameters separating said magnet material into a plurality of annular regions at different diameters across said hub portion.

* * * * *